United States Patent
Yoo et al.

(10) Patent No.: US 8,058,756 B2
(45) Date of Patent: Nov. 15, 2011

(54) SWITCHED RELUCTANCE MOTOR

(75) Inventors: Myung-Keun Yoo, Seoul (KR); Jun-Young Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 12/442,010

(22) PCT Filed: Sep. 6, 2007

(86) PCT No.: PCT/KR2007/004309
§ 371 (c)(1),
(2), (4) Date: Mar. 19, 2009

(87) PCT Pub. No.: WO2008/035876
PCT Pub. Date: Mar. 27, 2008

(65) Prior Publication Data
US 2009/0236951 A1 Sep. 24, 2009

(30) Foreign Application Priority Data
Sep. 21, 2006 (KR) .................. 10-2006-0091996

(51) Int. Cl.
*H02K 29/10* (2006.01)
(52) U.S. Cl. .................... 310/68 B; 310/49.43
(58) Field of Classification Search .......... 310/149.43, 310/68 B, 106, 166, 168, 216.075, 216.107, 310/216.118, 49.43
See application file for complete search history.

(56) References Cited

U.S. PATENT DOCUMENTS

| 5,239,218 | A | * | 8/1993 | Hashimoto et al. | 310/68 B |
| 5,996,209 | A | * | 12/1999 | Molnar et al. | 29/596 |
| 6,424,114 | B1 | * | 7/2002 | Komatsu | 318/721 |
| 6,661,140 | B2 | * | 12/2003 | Agnes et al. | 310/89 |
| 7,145,272 | B2 | * | 12/2006 | Nayak et al. | 310/68 B |
| 7,247,961 | B2 | * | 7/2007 | Nayak et al. | 310/68 B |
| 2004/0061464 | A1 | * | 4/2004 | Kim et al. | 318/362 |

FOREIGN PATENT DOCUMENTS

| KR | 10-2001-0010536 | 2/2001 |
| KR | 10-2004-0029618 | 4/2004 |
| KR | 10-2005-0081873 | 8/2005 |
| KR | 10-2006-0097264 | 9/2006 |

OTHER PUBLICATIONS

International Search Report dated Jan. 2, 2008.

* cited by examiner

*Primary Examiner* — Quyen Leung
*Assistant Examiner* — Naishadh Desai
(74) *Attorney, Agent, or Firm* — Ked & Associates, LLP

(57) ABSTRACT

A switched reluctance motor is provided that includes a housing, a stator and a rotor received and installed within the housing, and a rotor position detector that detects a rotational position of the rotor at an outer side of the housing. With such structure, assembly may be quickly and easily performed, a sensor may be easily repaired and checked, and a bad influence on the sensor by temperature and dust may be reduced.

14 Claims, 6 Drawing Sheets

[Fig. 1] Prior Art
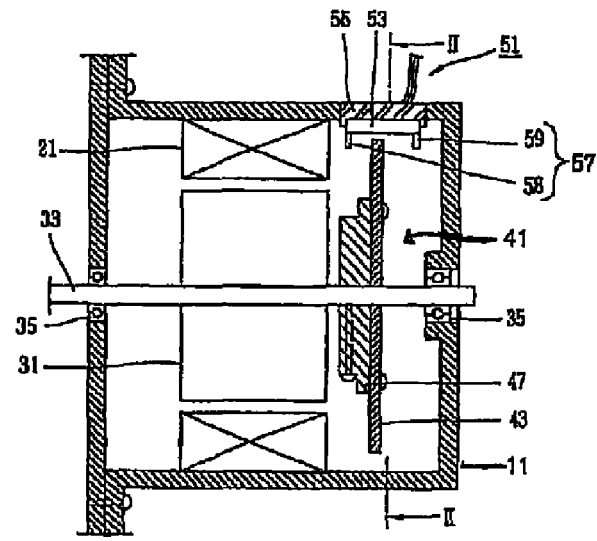
[Fig. 2] Prior Art
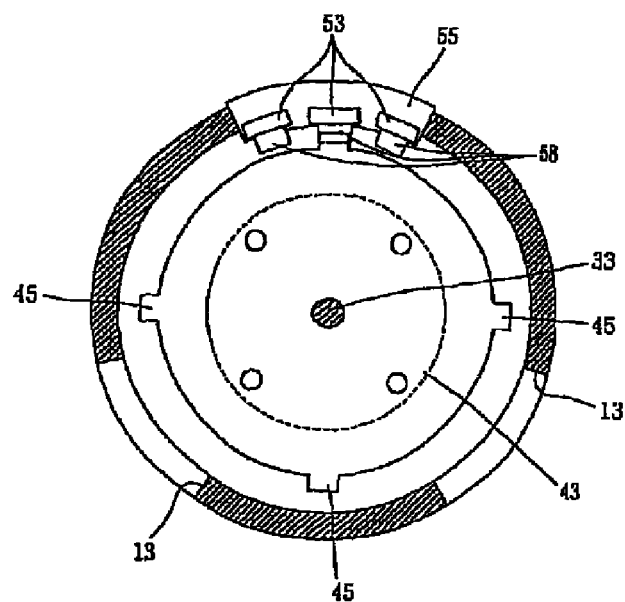

[Fig. 3]
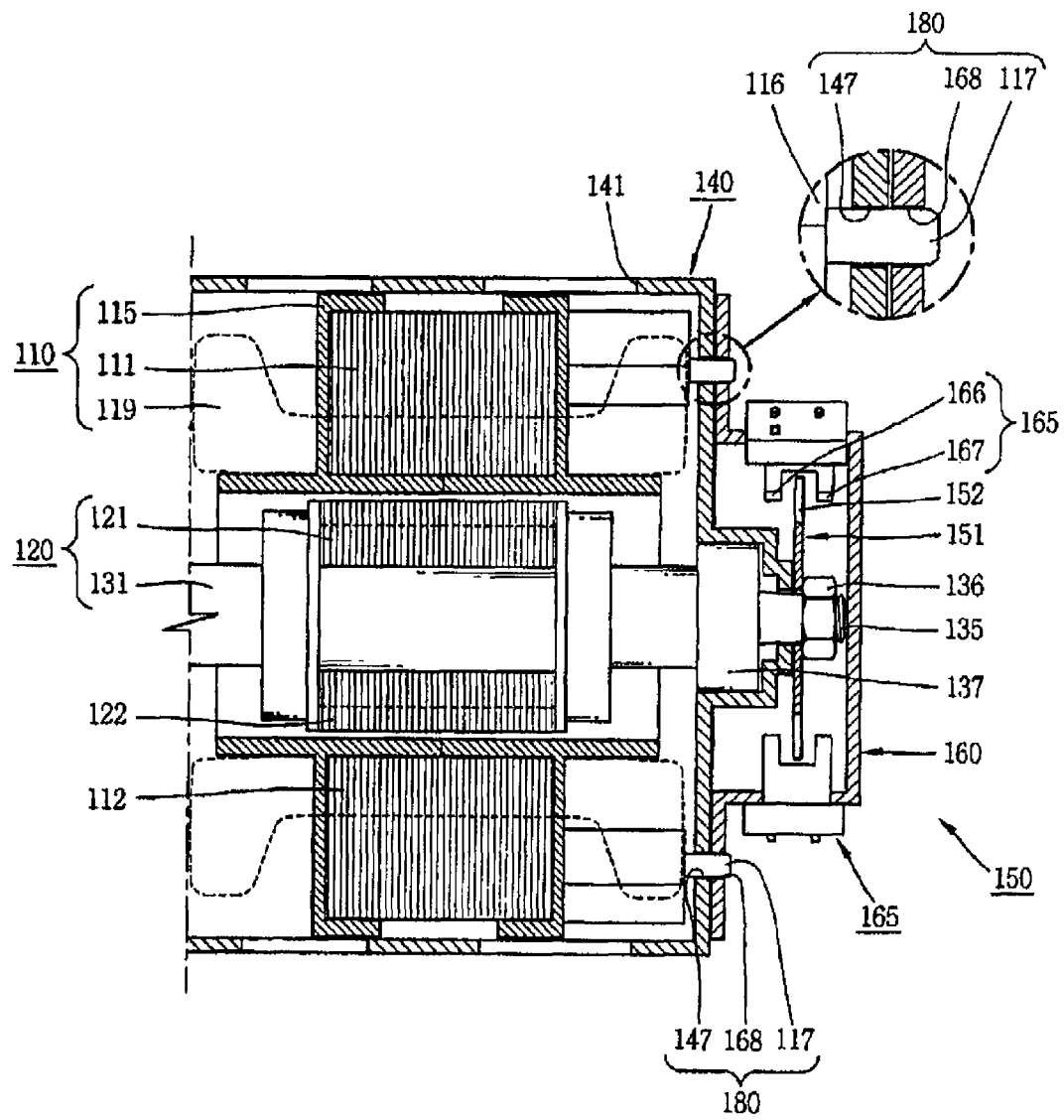

[Fig. 4]
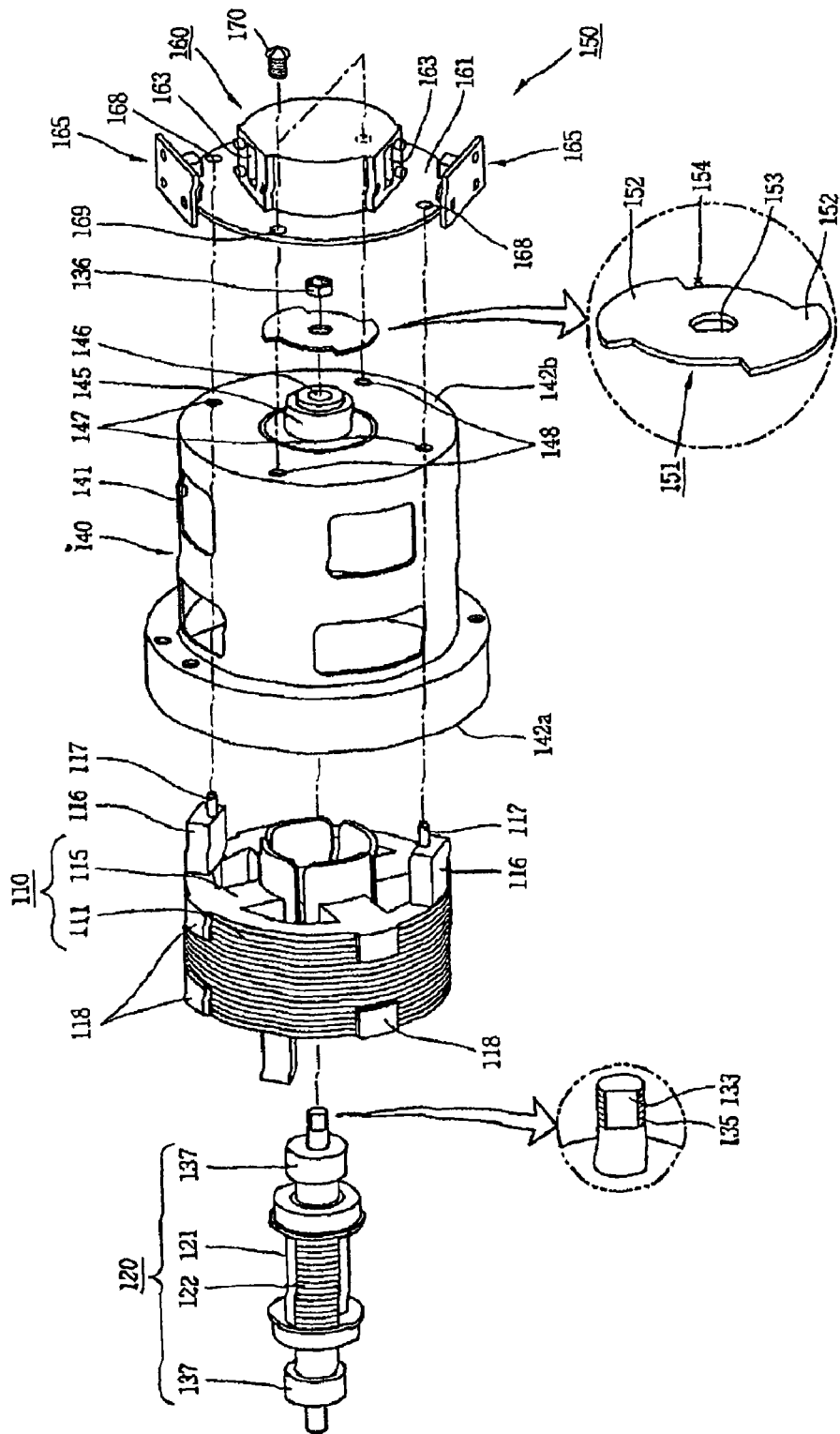

[Fig. 5]
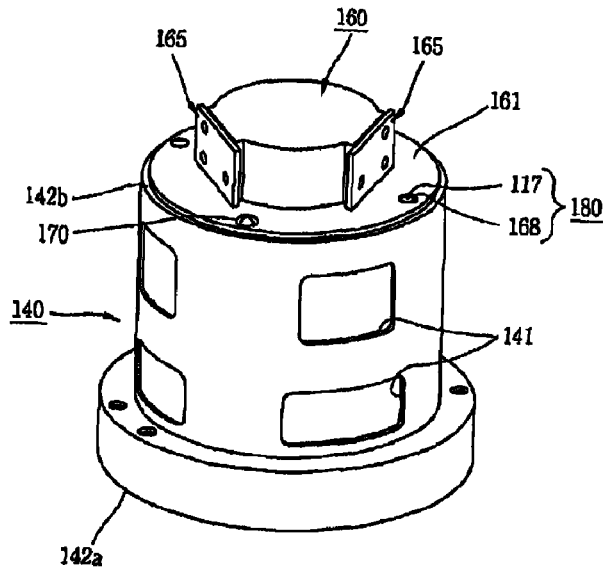
[Fig. 6]
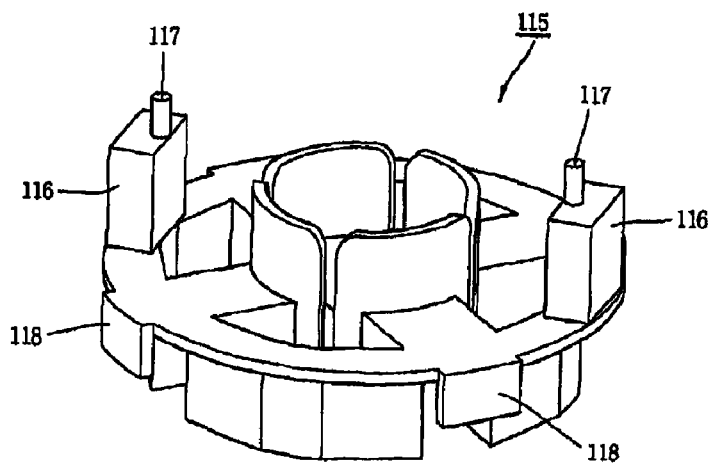
[Fig. 7]
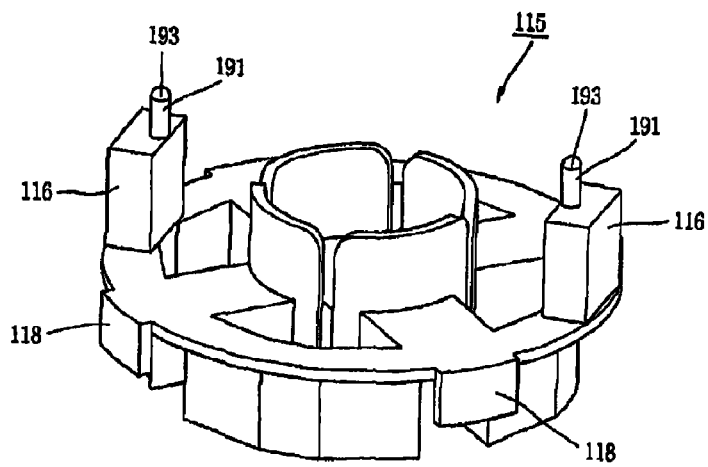

[Fig. 8]
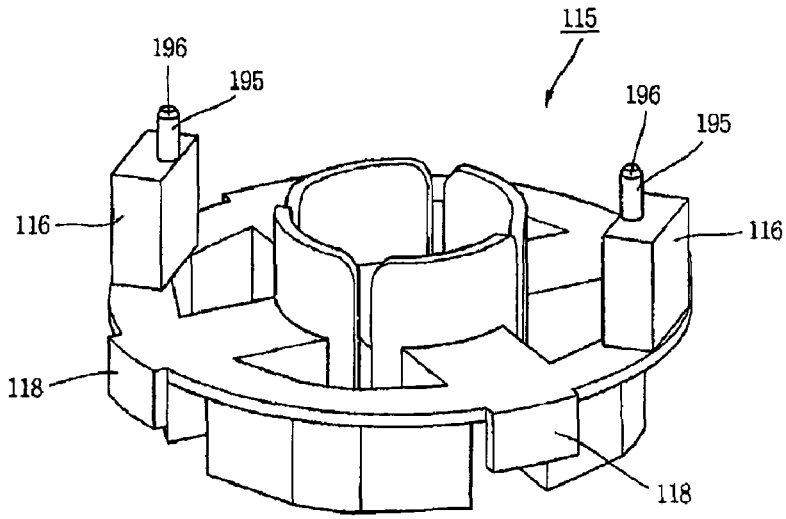
[Fig. 9]
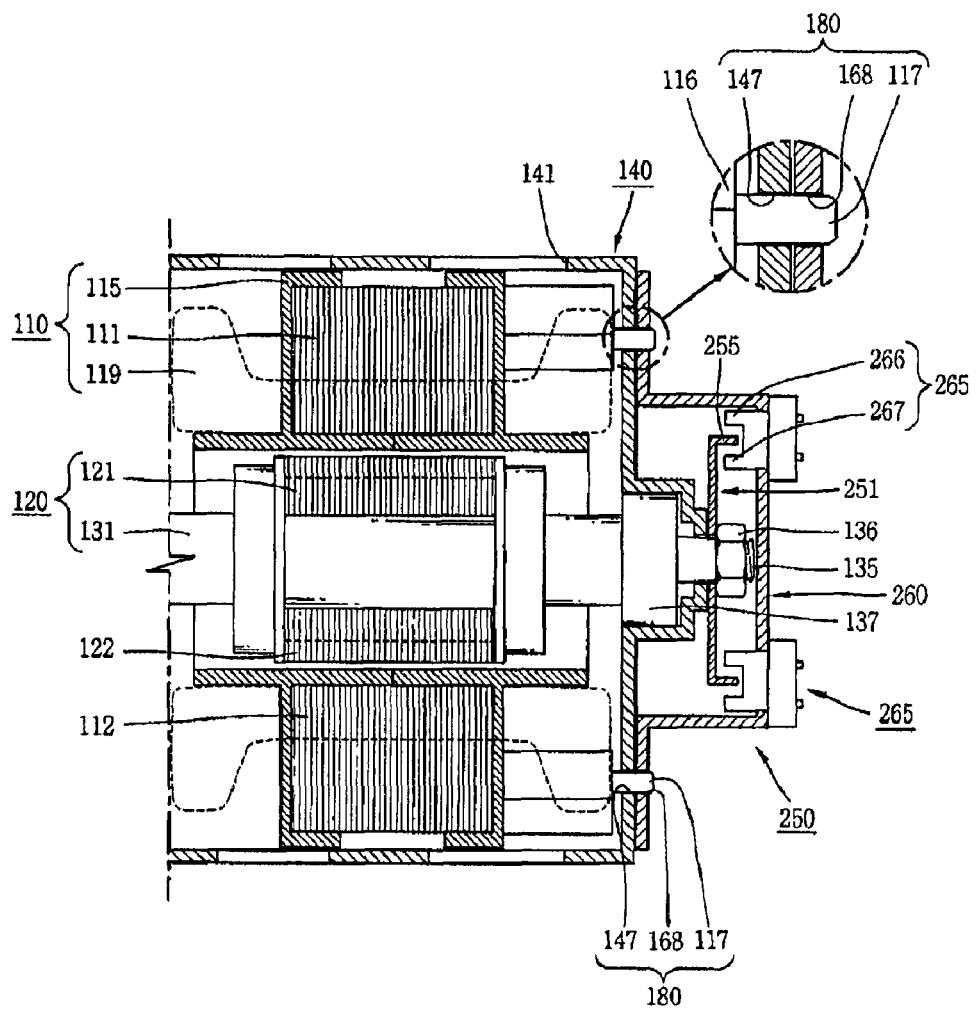

[Fig. 10]
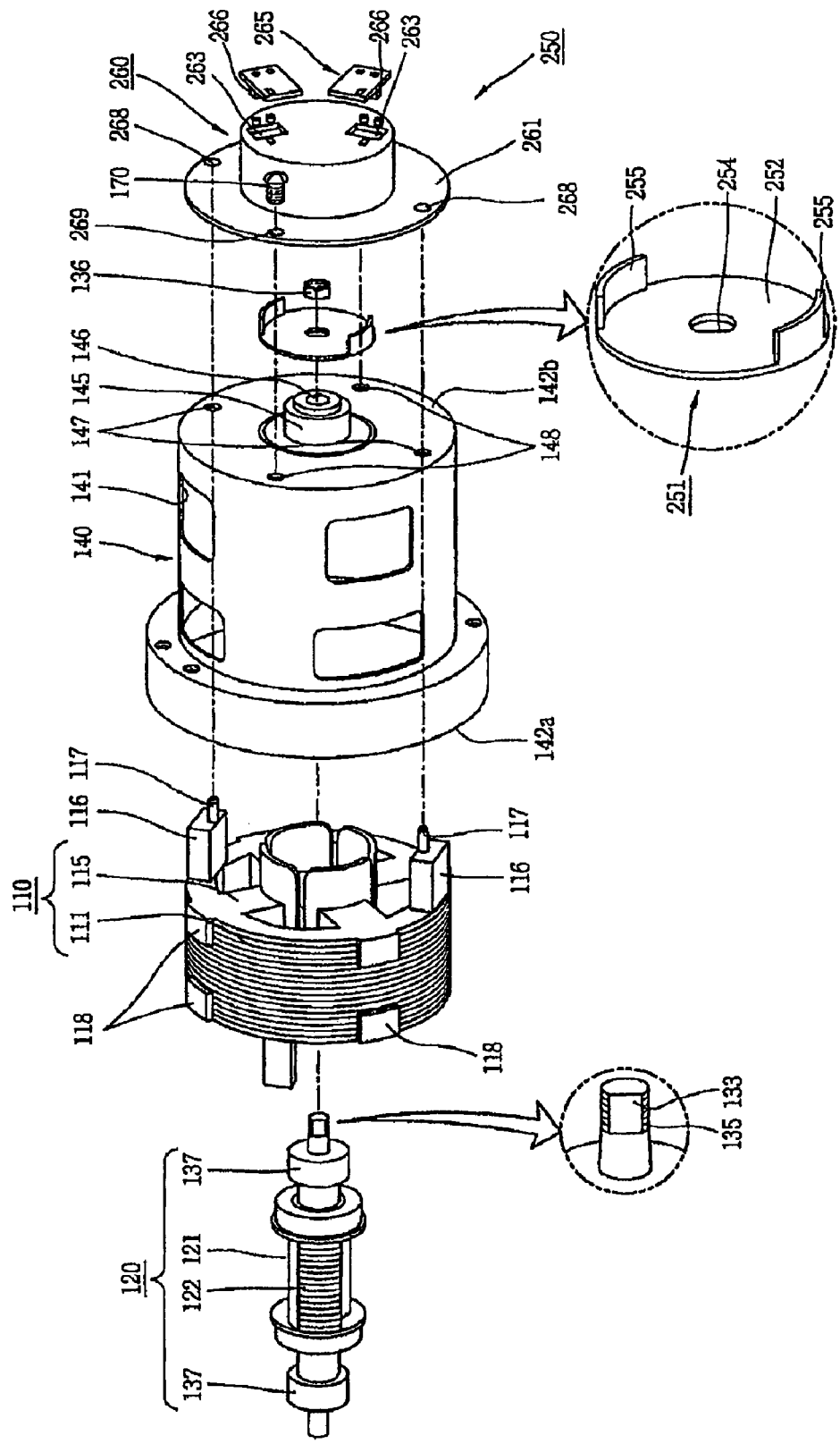

SWITCHED RELUCTANCE MOTOR

TECHNICAL FIELD

The present invention relates to a switched reluctance motor and, more particularly, to a switched reluctance motor that can be easily and quickly assembled.

BACKGROUND ART

As known, the switched reluctance motor (SRM), which is so-called an SR motor, rotates a rotor by using a reluctance torque according to a change in the magnetic reluctance and has advantages in that its fabrication cost is low, it does not need much maintenance and has such high reliability that its life span is substantially permanent.

FIG. 1 is a sectional view of the related art switched reluctance motor, and FIG. 2 is a sectional view taken along line II-II in FIG. 1. As shown in the drawings, the switched reluctance motor includes a housing 11, a stator 21 fixed within the housing 11, a rotor 31 rotatably disposed with respect to the stator 21, and a rotor position detecting unit 41 that detects a rotational position of the rotor 31.

A plurality of through holes 13 are formed at side portions of the housing 11 to allow the interior and exterior to communicate with each other, and the stator 21 is fixedly disposed within the housing 11. The rotor 31 is installed to be rotatable centering around a rotational shaft 33 within the stator 21. The rotational shaft 33 is rotatably supported by a bearing 35 fixed at the housing 11.

The rotor position detecting unit 41 includes a sensor disk 43 integrally and rotatably combined with the rotational shaft 33, and a sensor unit 51 interworks with the sensor disk 43 to detect a rotational position of the rotor 31.

The sensor disk 43 is formed in a disk type and includes multiple protrusions 45 formed to be protruded to outer side along a radial direction at the circumference thereof. A support member 47 is combined at one side of the sensor disk 43 and combined with the rotational shaft 33 to support the sensor disk 43.

The sensor unit 51 includes multiple PCBs 53, a PCB fixing member 55 for fixing the PCBs 53 at the housing 11, and a photo-interrupter 57 having a light emitting part 58 and a light receiving part 59 that are disposed to be spaced apart with the protrusion 45 of the sensor disk 43 interposed therebetween. Here, the PCBs 53 and the photo-interrupters 57 are provided by the number corresponding to the phases (three phases) of a coil of the stator 21 and combined at each pre-set position.

The related art switched reluctance motor has the following problems. That is, because the sensor unit 51 is combined in the through holes 13 formed at the side of the housing 11, the stator 21 needs to be combined within the housing 11 in consideration of the position of the sensor unit 51 during assembling, so much attention and precision are required for the assembling.

In addition, because the light emitting part 58 and the light receiving part 59 are disposed within the housing 11 in which temperature is high and there is much dust, the life span and sensitivity of the light emitting part 58 and the light receiving part 59 are negatively affected.

TECHNICAL GIST OF THE PRESENT INVENTION

Therefore, one object of the present invention is to provide a switched reluctance motor that can be easily and quickly assembled.

Another object of the present invention is to provide a switched reluctance motor with a sensor that can be easily repaired and checked.

Still another object of the present invention is to provide a switched reluctance motor capable of reducing a bad influence to a sensor due to temperature and dust.

To achieve the above objects, there is provided a switched reluctance motor including: a housing that forms a receiving space therein; a stator disposed within the housing; a rotor disposed to be rotatable with respect to the stator: and a rotor position detecting unit that detects a rotational position of the rotor at an outer side of the housing.

Here, the rotor includes a rotational shaft having one end portion disposed at the outer side of the housing, and the rotor position detecting unit may include a sensor disk combined with the rotational shaft such that it is integrally rotated with the rotational shaft at the outer side of the housing, and a sensor that detects a rotational position of the rotor by interacting with the sensor disk.

The rotor position detecting unit may further include a sensor support member combined with the housing and receiving the sensor disk and the sensor therein.

The sensor support member includes a combining part penetratingly formed to allow the sensor to be detachable and attachable at an outer side. The sensor may include a light emitting part and a light receiving part which are disposed to be spaced apart with the sensor disk interposed therebetween.

The sensor may be formed to correspond to each phase of a coil of the stator in order to detect the position of the rotor according to each phase of the coil of the stator.

The housing includes a through hole on a side surface thereof to allow air, which has been sucked along an axial line direction, to be discharged therethrough.

In another aspect, a switched reluctance motor includes a housing that forms a receiving space therein; a stator disposed within the housing; a rotor disposed to be rotatable with respect to the stator; a rotor position detecting unit that detects a rotational position of the rotor at an outer side of the housing; and an assembly guide unit that guides the rotor position detecting unit to be combined at a pre-set position with respect to the stator.

Here, the rotor position detecting unit may include: a sensor disk combined with the rotational shaft of the rotor at the outer side of the housing; a sensor that detects the position of the rotor by interacting with the sensor disk; and a sensor support member combined with the housing to support the sensor.

The assembly guide unit may include: a guide pin protruded from the stator and exposed after passing through the housing; and a pin hole formed at the sensor support member to allow the guide pin to be inserted therein.

The stator may include a stator core; a stator coil wound on the stator core; and an insulator combined with the stator core to insulate the stator coil, and the guide pin may be formed at the insulator.

Here, the guide pin may be made of the same material as that of the insulator, and the guide pin may be formed to be integrally injection-molded with the insulator.

An insertion guide part is formed at an end portion of the guide pin in order to guide the guide pin to be easily inserted into the pin hole.

The sensor disk includes a sensing portion and a blocking portion each having a different length along a radial direction, and the sensor may include a light emitting part and a light receiving part that are disposed to be spaced apart with the blocking portion interposed therebetween.

The sensor disk includes multiple blocking portions that are protruded along an axial line direction and are spaced apart along a circumferential direction, and the combining part may be formed at an end face of the sensor support member.

BRIEF DESCRIPTION OF THE DRAWINGS

FIG. 1 is a sectional view of the related art switched reluctance motor;

FIG. 2 is a sectional view taken along line II-II in FIG. 1.

FIG. 3 is a partial sectional view of a switched reluctance motor according to one exemplary embodiment of the present invention;

FIG. 4 is an exploded perspective view of FIG. 3;

FIG. 5 is a perspective view showing a combined state of a housing and a sensor support member in FIG. 4;

FIG. 6 is a perspective view of an insulator in FIG. 3;

FIGS. 7 and 8 are views showing modifications of a guide pin in FIG. 8;

FIG. 9 is a partial sectional view of a switched reluctance motor according to another exemplary embodiment of the present invention; and FIG. 10 is an exploded perspective view of FIG. 9.

MODE FOR CARRYING OUT THE PREFERRED EMBODIMENTS

As shown in FIGS. 3 and 4, the switched reluctance motor according to the present invention includes: a housing 140 that forms a receiving space therein; a stator 110 disposed within the housing 140; a rotor 120 disposed to be rotatable centering around a rotational shaft 131 with respect to the stator 110 within the housing 140; and a rotor position detecting unit that detects a rotational position of the rotor 120 at an outer side of the housing 140.

The stator 110 includes a stator core 111 with multiple salient poles 112, insulators 115 formed as insulation members and combined with both ends of the stator core 111, and a stator coil 119 wound on the circumference of the salient poles 112.

As shown in FIG. 4, the insulators 115 are combined with both ends of the stator core 111 and cooperatively covers to insulate an inner diameter surface of the stator core 111 and the salient poles 112 of the stator core 111. Multiple coupling protrusions 118 are provided at the insulators 115 and combined with the stator core 111.

The rotor 120 includes a rotor core 121 rotatably disposed within the stator 110 and having multiple salient poles 122 protruded along a radial direction, and a rotational shaft 131 integrally combined at the center of the rotor core 121. Bearings 137 are provided at both sides of the rotational shaft 131. Here, the stator 110 and the rotor 120 are implemented in the form of a 2-phase switched reluctance motor operated by two-phase power. Namely, the stator core 111 includes four salient poles 112 and the rotor 120 includes two salient poles 122. The two-phase (A,B) stator coil 119 are wound at each corresponding position of each salient pole 112 of the stator core 111 in order to supply current each with a different phase difference.

The housing 140 has a cylindrical shape with one side opened, and a plurality of through holes 141 are formed on the circumferential surface of the housing 140 such that the exterior and the interior communicate with each other therethrough. When the housing 140 is used as a cleaner motor, an impeller (not shown) is combined at an end portion 142a of the opened side of the housing 140 to suck air, and the through holes 141 can serve as an exhaust hole through which air, which has been blown in the axial line direction by the impeller, can be discharged.

The rotor position detecting unit 150 includes a sensor disk 151 combined at a pre-set position of the rotational shaft 131 at the outer side of the housing 140, sensors 165 interacting with the sensor disk 151, and a sensor support member 160 combined with the housing 140 and supporting the sensors 165.

A bearing coupling unit 145 is formed at an end portion 142b of the closed side of the housing 140 to allow the bearings 137 to be received and coupled. A shaft hole 146 is formed at the bearing coupling unit 145, to which the end portion of the rotational shaft 131 is coupled to be exposed.

At the end portion of the rotational shaft 131 exposed from the housing 140, there are formed a sensor disk combining part 133 to which the sensor disk 151 is combined to be rotatable together, and a male screw 135 that is fixed by a nut 136 after the sensor disk 151 is combined.

The sensor disk 151 includes a blocking portion 152 and a sensing portion 154 which have respective different lengths along a radial direction, and a shaft hole 153 is penetratingly formed at the center thereof, through which the end portion of the rotational shaft 131, namely, the sensor disk combining part 133 is inserted.

The sensor support member 160 has a container-like shape with one side opened, and a flange 161, which extends outwardly so as to surface-contact with the housing 140, is formed at the opened end portion. The sensors 165 are implemented as photo-interrupters for detecting a rotational position of the rotor 120 by interacting with the sensor disk 151 by including a light emitting part 166 that emits light and a light receiving part 167 that receives and senses light irradiated from the light emitting part 166. Herein, the sensor 165 is formed as a pair in order to detect the rotational position of the rotor 120 according to each phase (A and B) of the stator coil 119. Combining parts 163 are penetratingly formed at both sides of the sensor support member 160 so that the sensors 165 can be combined at certain positions.

An assembly guide unit 180 that guides assembly such that the sensor support member 160 can be disposed at a certain position with respect to the stator 110, is formed at the stator 110, the housing 140, and the sensor support member 160.

The assembly guide unit 180 includes guide pins 117 protruded from the stator 110 and penetrating the housing 140, and pin holes 168 formed at the sensor support member 160 to allow the guide pins 117 to be inserted therein.

As shown in FIG. 6, the guide pins 117 are formed on the insulator 115 disposed at a closed side of the housing 140 and insertedly combined with the sensor support member 160 after penetrating the housing 140. The guide pins 117 are formed to be protruded from supports 116 protruded from the surface of the insulator 115. Here, the insulator 115 is fabricated by injection-molding a synthetic resin member, and the supports 116 and the guide pins 117 are integrally made of the same synthetic resin material when the insulator 115 is injection-molded.

Guide pin combining holes 147 are formed at the housing 140, into which the guide pins 117 are insertedly combined, and pin holes 168 are formed at the sensor support member 160, into which the guide pins 117 are inserted. Female screws 148 and through holes 169 are formed at the housing 140 and the sensor support member 160, respectively, through which fastening members 170 such as screws or the like are combined to integrally combine the housing 140 and the sensor support member 160. Here, as shown in FIG. 7, guide pins 191 may be formed to have insertion guide parts 193 with an hemispherical end so as to be easily inserted into the guide pin combining holes 147 and the pin holes 168. In addition, the insulator 115 may be formed such that guide pins 195 may be formed and have chamfer-shaped insertion guide parts 196 with slant edges, as shown in FIG. 8.

With such a construction, by positioning the guide pins 117 to face the end portion 142b of the closed side of the housing 140, the stator 110 is inserted into the housing 140. When the guide pins 117 are inserted into corresponding guide pin combining holes 147, the sensor disk combining part 133 is allowed to face the end portion 142b of the closed side and the rotor 120 is inserted into the stator 110. When the end portion of the rotational shaft 131 is exposed to the exterior of the housing 140 through the shaft hole 146, the sensor disk 151 is combined to the rotational shaft 131 and the nut 136 is fastened to the male screw 135 so as to be fixed. Thereafter, as shown in FIG. 6, the sensor support member 160 is combined with the end portion of the housing 140 such that the guide pins 117 are inserted into the pin holes 168 of the sensor support member 160 and the fastening members 170 are combined with the female screws 148 to allow the sensor support member 160 to be fixed with the housing 140. When the combining of the sensor support member 160 is completed, the sensors 165 are combined with the combining parts 163.

When an operation starts, the rotor 120 is rotated centering around the rotational shaft 131, and the sensor disk 151 is integrally rotated with the rotor 120. The blocking portion 152 and the sensing portion 154 alternately pass through between the light emitting part 166 and the light receiving part 167 of the sensors 165. In this case, the sensors 165 sense the rotational position of the rotor 120 according to whether light irradiated from the light emitting part 166 is received by the light receiving part 167 or not.

FIG. 9 is a partial sectional view of a switched reluctance motor according to another exemplary embodiment of the present invention, and FIG. 10 is an exploded perspective view of FIG. 9. The same elements and equivalents to those shown in Figures and in the description, the same reference numerals are used and a corresponding detailed explanation is omitted merely for the sake of convenience. As shown in Figures, the switched reluctance motor includes the housing 140, the stator 110 disposed within the housing 140, the rotor 120 rotatably disposed with respect to the stator 110, the rotor position detecting unit 250 that detects a rotational position of the rotor 120 at an outer side of the housing 140, and the assembly guide unit 180 that guides such that the rotor position detecting unit 250 is combined at a pre-set position with respect to the stator 110.

The housing 140 has a cylindrical shape with one side opened, and a plurality of through holes 141 are formed on a circumferential surface thereof to allow the interior and the exterior thereof to communicate. the through holes 141 serve as exhaust ports through which air sucked into the housing 140 along the axial line direction can be discharged.

An assembly guide unit 180 is formed at the stator 110, the housing 140 and the sensor support member 260 to guide assembling such that the sensor support member 260 can be disposed at a certain position.

The assembly guide unit 180 includes guide pins 117 protruded from the stator 110 and penetrating the housing 140, and pin holes 268 formed on the sensor support member 260 to allow the guide pins 117 to be inserted thereinto.

The guide pins 117 are formed as pairs and protrusively formed at the supports 116 protrusively formed at one end portion of the insulator 115. Guide pin combining holes 147 are formed on the housing 140 to allow the guide pins 117 to be insertedly combined therein.

Female screws 148 and through holes 269 are formed on the housing 140 and the sensor support member 260 and allow fastening members 170 such as a screw to be combined therewith in order to integrally combine the housing 140 and the sensor support member 260. Here, one of the hemispherical insertion guide parts 192 or the chamfer-shaped insertion guide parts 195 as shown in FIGS. 7 and 8 may be formed at each end portion of the guide pins 117.

The rotor position detecting unit 250 includes a sensor disk 251 combined at a pre-set position of the rotational shaft 131 at an outer side of the housing 140, sensors 265 interacting with the sensor disk 251, and a sensor support member 260 combined with the housing 140 and supporting the sensor 265.

The sensor disk 251 includes a main body 252 combined with a sensor disk combining part 133 of the rotational shaft 131, and a plurality of blocking portions 255 protruded in an axial line direction from an outer circumference of the main body 252 and mutually separated in a circumferential direction.

A shaft hole 254 is formed at the center of the main body 252 so as to be combined with the sensor disk combining part 133 to restrain movement with respect to a rotational direction.

The sensor support member 260 has a cylindrical shape with one side opened. A flange 261 is formed at the opened end portion of the sensor support member 260 such that it extends outwardly so as to surface-contact with the housing 140, and pin holes 268 and through holes 269 are formed on the flange 261 such that they correspond to the guide pin insertion holes 147 and the female screws 148 of the housing 140, to allow the guide pins 117 and the fastening members 170 to be inserted therethrough.

Combining parts 263 are formed at the closed end portion of the sensor support member 260 to allow the sensors 265 to be insertedly combined therein.

The sensors 265 include light emitting parts 266 that emit light, and light receiving parts 267 that receive light irradiated from the light emitting parts 266, and detects a rotational position of the rotor 120 by interacting with the sensor disk 251. The sensors 265 are formed as a pair to detect the rotational position of the rotor according to each phase of the stator coil 119. Here, when the stator coil 119 has three phases, three sensors can be formed.

With such a construction, by positioning the guide pins 117 to face the end portion 142b of the closed side of the housing 140, the stator 110 is inserted into the housing 140. When the guide pins 117 are inserted into corresponding guide pin combining holes 147, the sensor disk combining part 133 is allowed to face the end portion 142b of the closed side and the rotor 120 is inserted into the stator 110. When the end portion of the rotational shaft 131 is exposed to the exterior of the housing 140 through the shaft hole 146, the blocking portions 255 are allowed to face the rear side, the sensor disk 151 is combined with the rotational shaft 131, and the nut 136 is fastened to the male screw 135 so as to be fixed.

When combining of the sensor disk 251 is completed, the guide pins 117 are inserted into the pin holes 268 of the sensor support member 260 to combine the sensor support member 260. The fastening members 170 are combined through the female screws 148 to fix the sensor support member 260 to the housing 140. When combining of the sensor support member 260 is completed, the sensors 265 are combined with the combining parts 263. When the operation starts, the rotor is rotated centering around the rotational shaft 131 and the sensor disk 251 is integrally rotated together with the rotor 120. Accordingly, the blocking portions 255 of the sensor disk 251 pass through the light emitting parts 266 and the light receiving parts 267, temporarily blocking light irradiated from the light emitting parts 266. At this time, the sensors 265 sense the rotational position of the rotor 120 according to whether the light irradiated from the light emitting parts 266 is received by the light receiving parts 267.

The present invention has the following effects.

Because the stator, the housing and the sensor support member are combined at accurate positions by means of the guide pin, the coupling hole and the pin hole, an operator does not need to pay much heed to the position of the stator during assembling and the assembling can be quickly and easily performed.

In addition, because the sensor is disposed at the outer side of the housing, the sensor can be easily repaired and checked. Moreover, because the guide pin penetrates the housing, the stator can be prevented from being rotated while being used.

Furthermore, because the sensor can be separately installed from the interior of the housing in which temperature is relatively high and there is much dust, a bad influence on the sensor by the temperature and dust can be prevented.

The invention claimed is:

1. A switched reluctance motor, comprising:
    a housing that forms a receiving space therein;
    a stator disposed within the housing;
    a rotor disposed to be rotatable with respect to the stator;
    a rotor position detector that detects a rotational position of the rotor, the rotor position detector being positioned at an outer side of the housing; and
    an assembly guide that guides the rotor position detector to be positioned at a predetermined position with respect to the stator, wherein the rotor position detector comprises:
        a sensor disk attached to a rotational shaft of the rotor at the outer side of the housing;
        at least one sensor that detects a position of the rotor by interacting with the sensor disk; and
        a sensor support member attached to the housing at the outer side of the housing, that supports the at least one sensor, and wherein the assembly guide comprises:
            at least one guide pin that protrudes from the stator and which is exposed at the outer side of the housing by passing through the housing; and
            at least one corresponding pin hole formed in the sensor support member, configured to receive the at least one guide pin inserted therethrough.

2. The motor of claim 1, wherein the stator comprises:
    a stator core;
    a stator coil wound on the stator core; and
    an insulator attached to the stator core, that insulates the stator coil, wherein the at least one guide pin is provided on the insulator.

3. The motor of claim 2, wherein the at least one guide pin is made of a same material as a material of the insulator.

4. The motor of claim 2, wherein the at least one guide pin is formed integral with the insulator by injection molding.

5. The motor of claim 1, wherein an insertion guide part is formed at an end portion of the at least one guide pin and guides the at least one guide pin to be inserted into the at least one corresponding pin hole.

6. The motor of claim 1, wherein the sensor support member has a container-like shape with one side open, and wherein the open side is attached to the housing.

7. The motor of claim 6, wherein the sensor support member comprises at least one combining part that allows the at least one sensor to be detachable from and attachable to the outer side of the housing.

8. The motor of claim 7, wherein the sensor disk includes a sensing portion and a blocking portion, each having a different length along a radial direction of the sensor disk, and wherein the at least one sensor includes a light emitting part and a light receiving part disposed to be spaced apart with the blocking portion interposed therebetween.

9. The motor of claim 8, wherein the at least one combining part is formed at a side of the sensor support member.

10. The motor of claim 7, wherein the sensor disk includes a plurality of blocking portions that protrudes from the sensor disk in an axial direction and which is spaced apart along a circumferential direction, and wherein the at least one combining part is formed in an end face of the sensor support member.

11. The motor of claim 1, wherein the at least one sensor includes a light emitting part and a light receiving part disposed to be spaced apart with the sensor disk interposed therebetween.

12. The motor of claim 1, wherein the at least one sensor comprises a plurality of sensors.

13. The motor of claim 1, wherein the plurality of sensors is formed to correspond, respectively, to each phase of a coil of the stator in order to detect the position of the rotor according to each phase of the coil of the stator.

14. The motor of claim 1, wherein the housing includes a through hole on a side surface thereof that allows air, which has been sucked along an axial direction of the housing, to be discharged therethrough.

* * * * *